(No Model.)
F. SHUMAN.
MACHINE FOR MANUFACTURING WIRE GLASS.
No. 510,823. Patented Dec. 12, 1893.
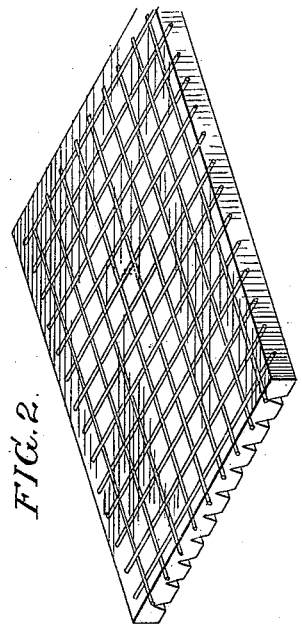
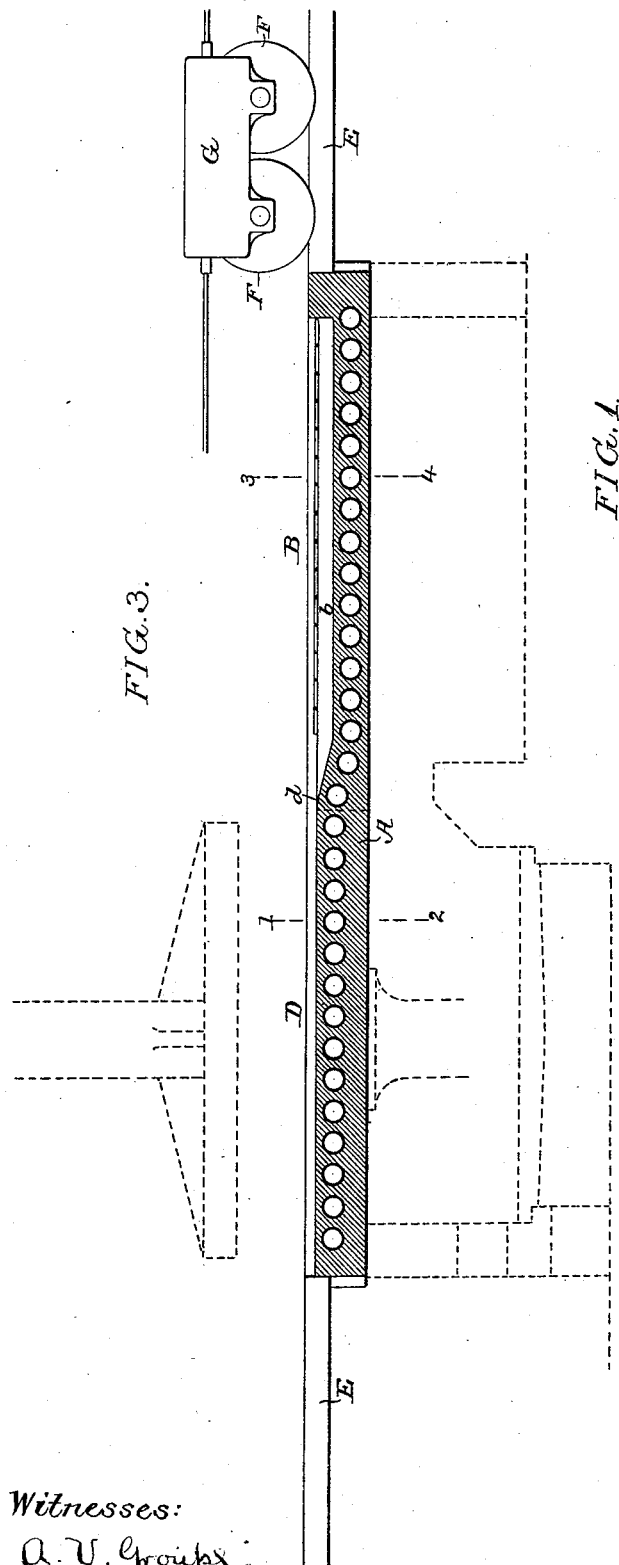
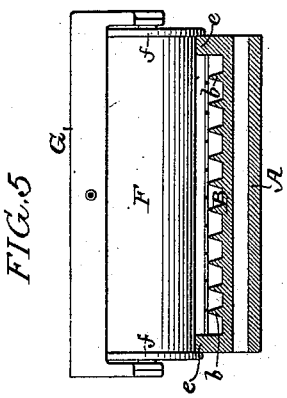
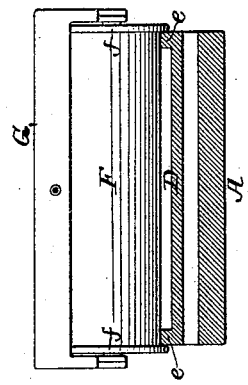
Witnesses:
A. V. Groups
Kew. Barkoff
Inventor:
Frank Shuman
by his Attorneys
Howson & Howson
THE NATIONAL LITHOGRAPHING COMPANY,
WASHINGTON, D. C.

United States Patent Office.

FRANK SHUMAN, OF PHILADELPHIA, PENNSYLVANIA.

MACHINE FOR MANUFACTURING WIRE-GLASS.

SPECIFICATION forming part of Letters Patent No. 510,823, dated December 12, 1893.

Application filed December 29, 1892. Serial No. 456,675. (No model.)

*To all whom it may concern:*

Be it known that I, FRANK SHUMAN, a citizen of the United States, and a resident of Philadelphia, Pennsylvania, have invented certain Improvements in Machines for Manufacturing Wire-Glass, of which the following is a specification.

The object of my invention is to construct a machine for carrying out the process of manufacturing what is termed wire glass, filed by me of even date herewith.

In the accompanying drawings: Figure 1, is a sectional view of a sheet of wire glass made in accordance with my invention. Fig. 2, is a perspective view illustrating the glass prior to the final pressing, illustrating the ribs or projections on one side of the glass. Fig. 3, is a longitudinal sectional view of the machine. Fig. 4, is a transverse sectional view on the line 1—2, Fig. 3. Fig. 5, is a transverse sectional view on the line 3—4, Fig. 3.

A is the bed of the machine mounted on a suitable foundation, and in the present instance I have shown the bed heated by gas, tubes being formed in the bed, but a furnace shown by dotted lines may be used in place of the gas tubes without departing from my invention.

The bed has two surfaces B and D. The surface B is a ribbed surface, the ribs $b$ extending in the present instance lengthwise of the bed, and are V-shaped in form. The height of these ribs depends on the thickness of glass to be manufactured. The surface D is a flat surface preferably on a level with the upper edges of the ribs, but may be on a level with the lower edge of the ribs or mid-way between the two. The glass after having the ribs rolled in it is drawn over upon the flat surface D, and the ribs gradually merge into the flat surface, as shown at $d$, so as to present an unobstructed way for the glass.

On each side of the table A are rails $e$, $e$, which align with the rails E at each end of the table. Upon these rails travel the rollers F having flanges $f$. The rollers are mounted on a suitable carriage G, which can be drawn over the table either by hand or power. In some instances a single roll may be used if desired, two rolls being used simply to make a better support for the carriage.

The wire or wire gauze is placed upon the ribbed portion of the table; the molten glass is poured onto and through the openings or meshes of the wire, and the roller is moved over the glass spreading it out and forcing it into the spaces between the ribs of the table, after which the glass with the wire is drawn over upon the flat surface D of the table, and the roller is again passed over the glass, pressing out the ribs, the glass of the ribs closing up the channels between them, and after the roll is passed over, the glass is removed and presents a smooth surface on both sides with the wire embedded within the glass.

The ribs may extend transversely instead of longitudinally, and projections may be formed instead of ribs, and the ribs may be shaped differently from the ribs shown in the drawings, the idea being to so form the ribs that they will support the wire and allow sufficient glass to pass through the meshes.

Instead of using a roller for the final operation, a press or plunger may be used as shown by dotted lines in Fig. 3, or the glass may pass under a fixed platen situated above the surface D, and that portion of the table may be lifted by a plunger, and the glass squeezed between the platen and the surface, gaining the same result as that obtained by the roller.

I do not, in this application, broadly claim the ribbed bed, as this forms the subject of a separate application filed by me on November 23, 1893, Serial No. 491,694.

I claim as my invention—

1. In a machine for embedding wire in glass, the combination of the bed having a ribbed and a flat surface, with means for pressing the glass first on the ribbed bed and then on the smooth bed, substantially as set forth.

2. In a machine for embedding wire in glass, the combination of the bed having a ribbed and a flat surface, with a roller adapted to travel over said bed, substantially as described.

3. In a machine for manufacturing wire glass, the combination of the table having a ribbed portion upon which the wire is mounted, said ribs extending lengthwise of the table, with a flat portion adjoining said ribbed portion so that the glass after being rolled upon the ribbed portion can be drawn over upon the flat portion, with a roller for rolling the glass, substantially as described.

4. The combination of the table, mechanism for heating the same, V-shaped ribs on one portion of the table, the other portion of the table being flat and adapted to receive the glass from the V-shaped portion, rails on each side of the table, and a roller adapted to the rail and to move over the table and press the glass, substantially as described.

In testimony whereof I have signed my name to this specification in the presence of two subscribing witnesses.

FRANK SHUMAN.

Witnesses:
HENRY HOWSON,
JOSEPH H. KLEIN.